(No Model.)
W. LUM.
COTTON SCRAPER.
No. 508,431. Patented Nov. 14, 1893.
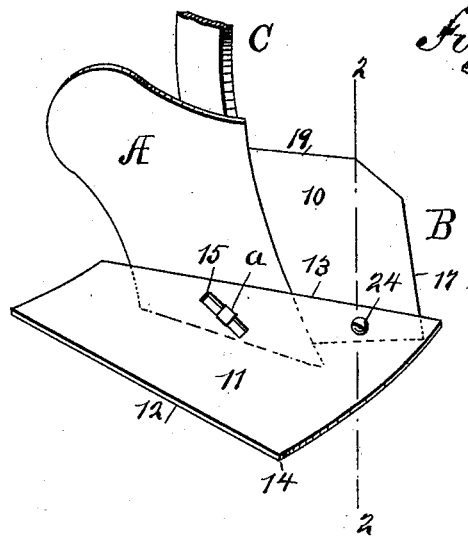
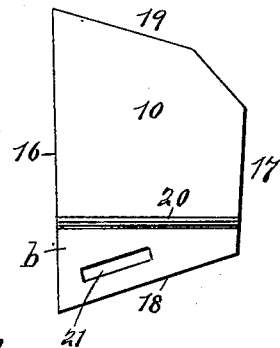
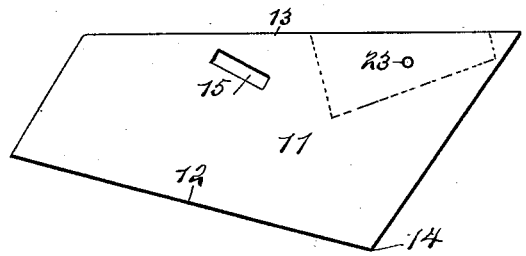
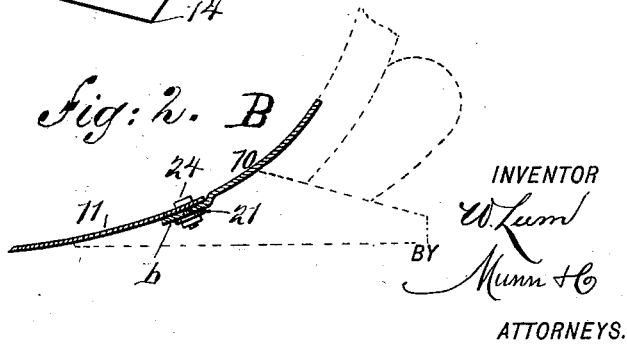
WITNESSES:
Chas Nida
C. Sedgwick
INVENTOR
W. Lum
BY Munn & Co
ATTORNEYS.

United States Patent Office.

WILLIAM LUM, OF CARTHAGE, MISSISSIPPI, ASSIGNOR TO HIMSELF AND LEWIS M. GARRETT, OF SAME PLACE.

COTTON-SCRAPER.

SPECIFICATION forming part of Letters Patent No. 508,431, dated November 14, 1893.

Application filed March 14, 1893. Serial No. 465,965. (No model.)

*To all whom it may concern:*

Be it known that I, WILLIAM LUM, of Carthage, in the county of Leake and State of Mississippi, have invented a new and useful Improvement in Cotton-Scrapers, of which the following is a full, clear, and exact description.

My invention relates to an improvement in cotton scrapers, and it has for its object to provide an implement which will be adapted for attachment to a turning plow of any description, or to any other form of plow having a removable point.

Another object of the invention is to provide a cotton scraper capable of being adjusted upon itself as well as upon the plow, and which may be used to scrape a field without necessarily cultivating the crop by disturbing the ground.

Another object of the invention is to so shape the scraper that it will not injure the young plants in the slightest degree, nor will it cause the earth to be thrown upon them.

The invention consists in the novel construction and combination of the several parts, as will be hereinafter fully set forth and pointed out in the claims.

Reference is to be had to the accompanying drawings forming a part of this specification, in which similar figures and letters of reference indicate corresponding parts in all the views.

Figure 1 is a perspective view of the scraper attachment applied to a plow. Fig. 2 is a section taken practically on the line 2—2 of Fig. 1. Fig. 3 is a plan view of the scraper point; and Fig. 4 is a similar view of the fender.

In carrying out the invention the point of the plow wing A, is removed, and the scraper attachment B, is applied to the plow shank C, through the medium of a bolt $a$, utilized for attaching and holding the point to the share. The scraper B, is constructed in two parts, namely, a fender 10 and a scraper point 11.

The scraper point 11 is of irregular form, and consists of a metal plate transversely curved in such manner as to present a concaved upper and a convexed lower face. The lower or cutting line 12 of the scraper point is straight while the upper longitudinal line 13 is diagonal, whereby one end of the scraper point is of much greater width than the other, and both ends of the scraper point are made beveled or inclined, as shown in Fig. 3, the cutting point of the scraper being located at 14, at the junction of the longer side line with the straight cutting edge 12.

At or about the center of the upper portion of the scraper a diagonal opening 15, is produced, and this opening is adapted to receive the bolt $a$, utilized to attach the scraper to the plow shank or standard. The fender 10 is also of irregular shape, and is curved longitudinally or vertically, its forward face being concaved and its rear or back face convexed. The two sides 16 and 17 of the fender are preferably made straight, the lower edge 18 is decidedly inclined or beveled, and the upper edge 19, may be of any desired shape, but ordinarily it is inclined, the outer upper corner being cut off. Near the lower edge of the fender a transverse line 20, is drawn, and the surface between that line and the lower edge 18, is depressed, the said surface being designated in the drawings as $b$, and in this depressed surface a slot 21, is made, preferably located parallel with the lower edge of the fender as is best shown in Fig. 4. The depressed portion of the fender is adapted to be placed in engagement with the back of the scraper at the upper portion thereof, near its forward or wide edge, the position of the depressed surface upon the scraper being indicated by dotted lines in Fig. 3.

The scraper, in that surface against which the depressed portion of the fender is pressed, has an opening 23, produced in it, and the fender is attached to the scraper by passing a suitable bolt 24 through the scraper opening 23 and through the slot 21 in the fender. Thus it will be observed that the fender is adjustable upon the scraper, and that the scraper is likewise capable of adjustment upon the shank to which it is applied.

In operation, the scraper attachment may be secured to any ordinary plow, or a turning plow having a removable point, the scraper point 11 taking the place of the ordinary point, and the fender extends upward from the scraper blade to an engagement with the land side edge of the plow to which the attachment is to be applied, as shown in Fig. 1; and by reason of the adjustment of the fender upon the scraper point the former may be adjusted to fit or contact with plows of different curves at their land side edge, while the scraper blade or plate may be adjusted upon the plow shank to cause the blade or plate to enter the ground.

In the operation of this device, the ground over which it is passed will be effectually scraped without being turned up or cultivated, and the weeds, chaff, straw, and other foreign matter in the path of the implement as well as the earth sliced by the blade or scraper plate, will be carried upward by the curvature of the scraper blade or plate and delivered to the fender, from whence such matter is conveyed in a natural manner to the wing of the plow, over which it will pass, and will fall such a distance from the plants being treated as not to injure them in the slightest degree.

Having thus described my invention, I claim as new and desire to secure by Letters Patent—

1. A scraper attachment for plows consisting in the scraper blade 11 having a straight upper edge 13, an inclined lower edge 12 and formed with its forward edge of greater length than its rear edge, and the curved fender 10 secured adjustably at its lower edge to the upper forward corner of the scraper; the inner edge of the scraper being adapted to register with the landside of the plow and the upper edge of the scraper in rear of the fender being adapted to register with the lower edge of the mold board, substantially as set forth.

2. The combination with the scraper blade 11 having a straight upper edge 13 a wide inclined forward edge and an inclined lower edge 12, an oblique slot 15 in its portion which lies against the plow, and a bolt aperture 23 in its upper forward corner beyond the plow and the fender 10 having a transverse shoulder forming offset 20 near its lower edge, an oblique slot 21, in its offset portion and registering with the aperture 23, a bolt 24 extending through said aperture and slot 21, substantially as set forth.

WILLIAM LUM.

Wiinesses:
T. D. McCullough,
J. H. Neice.